United States Patent
Huang et al.

(10) Patent No.: US 12,256,100 B2
(45) Date of Patent: Mar. 18, 2025

(54) DYNAMIC MESH VERTEX DISPLACEMENTS CODING

(71) Applicant: Tencent America LLC, Palo Alto, CA (US)

(72) Inventors: Chao Huang, Palo Alto, CA (US); Xiaozhong Xu, Palo Alto, CA (US); Jun Tian, Palo Alto, CA (US); Xiang Zhang, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 30 days.

(21) Appl. No.: 18/315,020

(22) Filed: May 10, 2023

(65) Prior Publication Data

US 2024/0007670 A1     Jan. 4, 2024

Related U.S. Application Data

(60) Provisional application No. 63/358,084, filed on Jul. 1, 2022.

(51) Int. Cl.
*H04N 19/597*     (2014.01)
*H04N 19/172*     (2014.01)
(Continued)

(52) U.S. Cl.
CPC ......... *H04N 19/597* (2014.11); *H04N 19/172* (2014.11); *H04N 19/46* (2014.11); *H04N 19/70* (2014.11)

(58) Field of Classification Search
CPC .... H04N 19/597; H04N 19/172; H04N 19/46; H04N 19/70; H04N 19/13; H04N 19/137;
(Continued)

(56) References Cited

U.S. PATENT DOCUMENTS

| | | | |
|---|---|---|---|
| 6,573,890 B1 * | 6/2003 | Lengyel | G06T 17/20 345/418 |
| 2008/0031325 A1 * | 2/2008 | Qi | H04N 19/176 375/240.09 |

(Continued)

OTHER PUBLICATIONS

Jerome M. Shapiro, "Embedded Image Coding Using Zerotrees of Wavelet Coefficients", IEEE Transactions on Signal Processing, Dec. 1993, vol. 41, No. 12, pp. 3445-3462.

(Continued)

*Primary Examiner* — Boubacar Abdou Tchoussou
(74) *Attorney, Agent, or Firm* — Sughrue Mion, PLLC

(57) ABSTRACT

A method and apparatus that derives a curve of a mesh sequence from a frame of a video bitstream, the curve comprising a plurality of vertices; subdivides the curve by adding a plurality of subdivided vertices; calculates one or more displacement vectors between each of the plurality of vertices on the curve and each of the plurality of subdivided vertices on the subdivided curve; transforms the one or more displacement vectors to output one or more original coefficients; tracks the current frame with a previous frame to obtain a one-to-one correspondence between the plurality of vertices of the current frame and a plurality of vertices of the previous frame; predicts one or more coefficients of each of the plurality of vertices in current frame based on the one-to-one correspondence; performs entropy coding on one or more prediction residues; and encodes the one or more prediction residues.

17 Claims, 6 Drawing Sheets

(51) Int. Cl.
*H04N 19/46* (2014.01)
*H04N 19/70* (2014.01)

(58) Field of Classification Search
CPC .... H04N 19/54; H04N 19/593; G06T 3/4023; G06T 7/246
See application file for complete search history.

(56) References Cited

U.S. PATENT DOCUMENTS

2017/0289543 A1   10/2017   Guo et al.
2019/0208222 A1   7/2019   Ugur et al.
2020/0077119 A1   3/2020   Wenger et al.
2023/0290063 A1*   9/2023   Mammou ............ G06T 17/205
2023/0386087 A1*   11/2023   Marvie ................ G06T 9/001

OTHER PUBLICATIONS

Written Opinion of the International searching Authority dated Aug. 31, 2023 in Application No. PCT/US23/22822.
International Search Report dated Aug. 31, 2023 in Application No. PCT/US23/22822.

* cited by examiner

DYNAMIC MESH VERTEX DISPLACEMENTS CODING

CROSS-REFERENCE TO RELATED APPLICATION

This application claims priority from U.S. Provisional Application No. 63/358,084, filed on Jul. 1, 2022, the disclosure of which is incorporated herein by reference in its entirety.

TECHNICAL FIELD

This disclosure is directed to a set of advanced video coding technologies. More specifically, the present disclosure is directed to compression techniques to encode vertex displacements of a dynamic subdivided mesh.

BACKGROUND

The advances in 3D capture, modeling, and rendering have promoted the ubiquitous presence of 3D contents across several platforms and devices. Nowadays, it is possible to capture a baby's first step in one continent and allow the grandparents to see (and maybe interact) and enjoy a full immersive experience with the child in another continent. Nevertheless, in order to achieve such realism, models are becoming ever more sophisticated, and a significant amount of data is linked to the creation and consumption of those models. 3D meshes are widely used to represent such immersive contents.

A dynamic mesh sequence may require a large amount of data since it may consist of a significant amount of information changing over time. Therefore, efficient compression technologies are required to store and transmit such contents. Mesh compression standards IC, MESHGRID, FAMC were previously developed by MPEG to address dynamic meshes with constant connectivity and time varying geometry and vertex attributes. However, these standards do not take into account time varying attribute maps and connectivity information. DCC (Digital Content Creation) tools usually generate such dynamic meshes. In counterpart, it is challenging for volumetric acquisition techniques to generate a constant connectivity dynamic mesh, especially under real time constraints. This type of contents is not supported by the existing standards. There is a need for a new mesh compression standard to directly handle dynamic meshes with time varying connectivity information and optionally time varying attribute maps. Such a standard would target lossy, and lossless compression for various applications, such as real-time communications, storage, free viewpoint video, AR and VR. Functionalities such as random access and scalable/progressive coding are also considered.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

The present disclosure provides compression techniques to encode vertex displacements of a dynamic subdivided mesh.

According to some embodiments, there is provided a method performed by at least one processor that may include deriving a curve of a mesh sequence from a frame of a video bitstream, the curve comprising a plurality of vertices; subdividing the curve by adding a plurality of subdivided vertices; calculating one or more displacement vectors between each of the plurality of vertices on the curve and each of the plurality of subdivided vertices on the subdivided curve; transforming the one or more displacement vectors to output one or more original coefficients; and determining if the current frame is coded using inter picture information or intra picture information. In response to determining that the current frame is coded using inter picture information, the method may include tracking the current frame with a previous frame to obtain a one-to-one correspondence between the plurality of vertices of the current frame and a plurality of vertices of the previous frame; predicting one or more coefficients of each of the plurality of vertices in current frame based on the one-to-one correspondence; performing entropy coding on one or more prediction residues; and encoding the one or more prediction residues based on the one or more predicted coefficients; In response to determining that the current frame is coded using intra picture information the method may include encoding one or more coefficients using arithmetic coding.

According to other aspects of one or more embodiments, there is also provided an apparatus and non-transitory computer readable medium consistent with the method.

Additional embodiments will be set forth in the description that follows and, in part, will be apparent from the description, and/or may be learned by practice of the presented embodiments of the disclosure.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

The following detailed description of example embodiments refers to the accompanying drawings. The same reference numbers in different drawings may identify the same or similar elements.

A mesh may include several polygons that describe the surface of a volumetric object. Its vertices in 3D space and the information of how the vertices are connected may define each polygon, referred to as connectivity information. Optionally, vertex attributes, such as colors, normals, etc., may be associated with the mesh vertices. Attributes may also be associated with the surface of the mesh by exploiting mapping information that parameterizes the mesh with 2D attribute maps. Such mapping may be defined using a set of parametric coordinates, referred to as UV coordinates or texture coordinates, and associated with the mesh vertices. 2D attribute maps may be used to store high resolution attribute information such as texture, normals, displacements etc. Such information may be used for various purposes such as texture mapping, shading, and mesh reconstruction.

In this disclosure, a number of methods are proposed to improve existing approaches to compression of vertex displacements of dynamic subdivide meshes. Those methods may be applied individually or by any form of combinations. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

Figure 1:
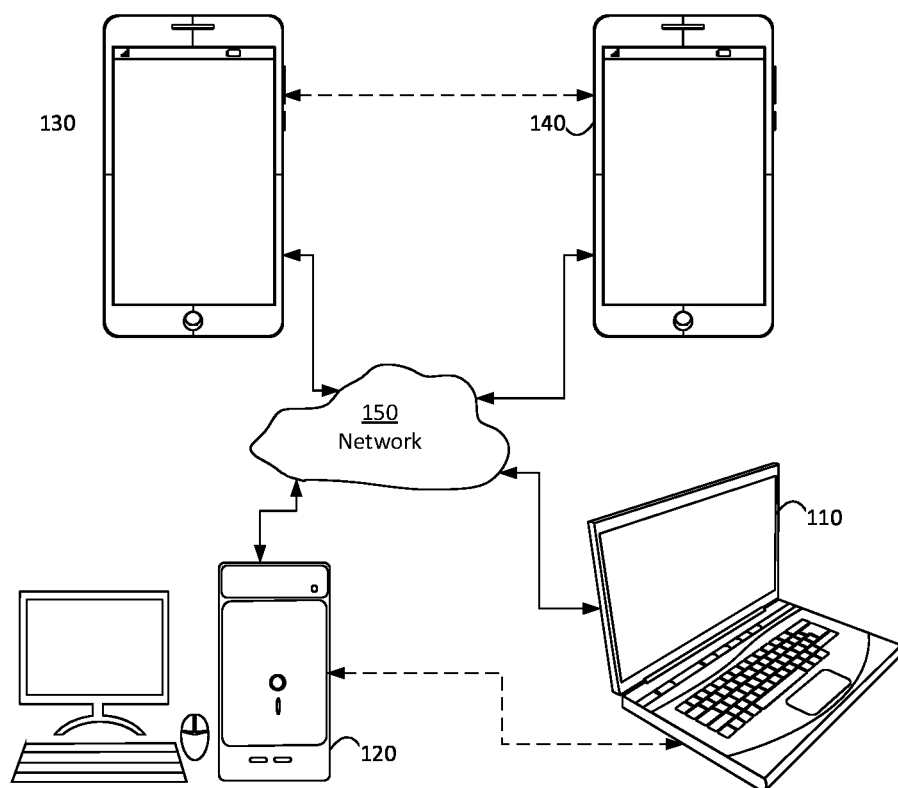
FIG. 1 is a schematic illustration of a simplified block diagram of a communication system, according to some embodiments.
Figure 2:
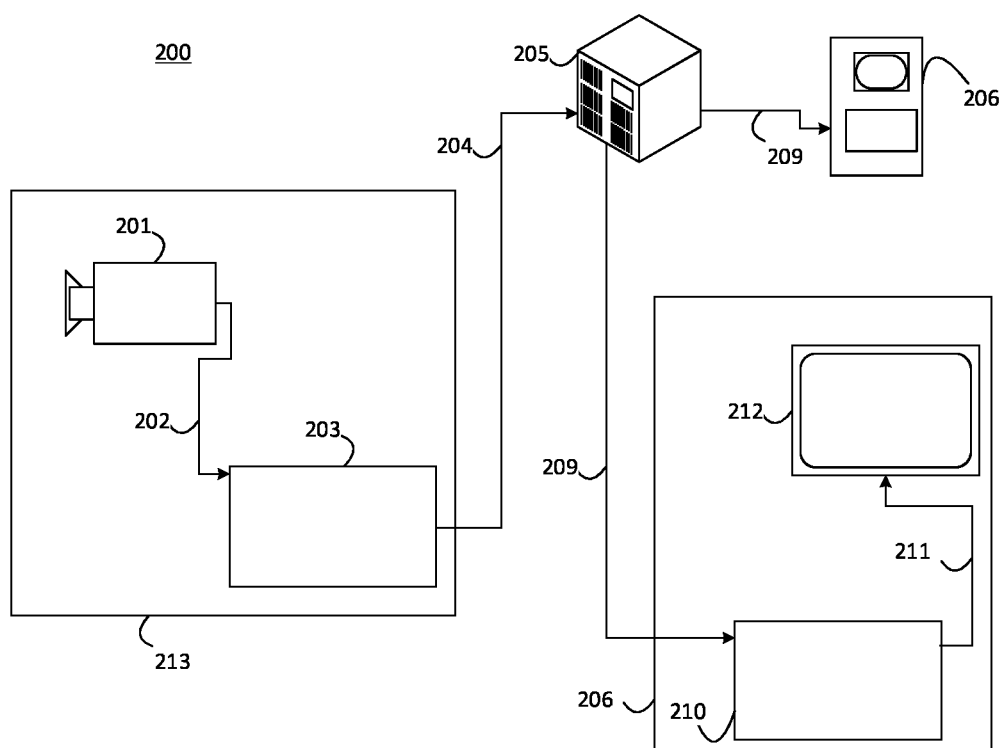
FIG. 2 is a schematic illustration of a simplified block diagram of a streaming system, according to some embodiments.

With reference to FIGS. 1-2, an embodiment of the present disclosure for implementing encoding and decoding structures of the present disclosure are described.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data, which may include mesh data, at a local location for transmission to the other terminal 120 via the network 150. The second terminal 120 may receive the coded video data of the other terminal from the network 150, decode the coded data and display the recovered video data. Unidirectional data transmission may be used in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminals. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

FIG. 2 illustrates, as an example of an application for the disclosed subject matter, a placement of a video encoder and decoder in a streaming environment. The disclosed subject matter may be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 may create, for example, a stream 202 that includes a 3D mesh and metadata associated with the 3D mesh. The video source 201 may include, for example, 3D sensors (e.g. depth sensors) or 3D imaging technology (e.g. digital camera(s)), and a computing device that is configured to generate the 3D mesh using the data received from the 3D sensors or the 3D imaging technology. The sample stream 202, which may have a high data volume when compared to encoded video bitstreams, may be processed by the encoder 203 coupled to the video source 201. The encoder 203 may include hardware, software, or a combination thereof to enable or implement aspects of the disclosed subject matter as described in more detail below. The encoder 203 may also generate an encoded video bitstream 204. The encoded video bitstream 204, which may have e a lower data volume when compared to the uncompressed stream 202, may be stored on a streaming server 205 for future use. One or more streaming clients 206 may access the streaming server 205 to retrieve video bit streams 209 that may be copies of the encoded video bitstream 204.

The streaming clients 206 may include a video decoder 210 and a display 212. The video decoder 210 can, for example, decode video bitstream 209, which is an incoming copy of the encoded video bitstream 204, and create an outgoing video sample stream 211 that may be rendered on the display 212 or another rendering device (not depicted). In some streaming systems, the video bitstreams 204, 209 may be encoded according to certain video coding/compression standards.

As stated above, a dynamic mesh sequence may require a large amount of data since it may consist of a significant amount of information changing over time. Subdivision based methods may be utilized to compress dynamic mesh sequences, where displacements of the vertices of subdivided meshes will be signaled, so efficient coding of displacements is required for high-performance compression of dynamic meshes.

Figure 3:
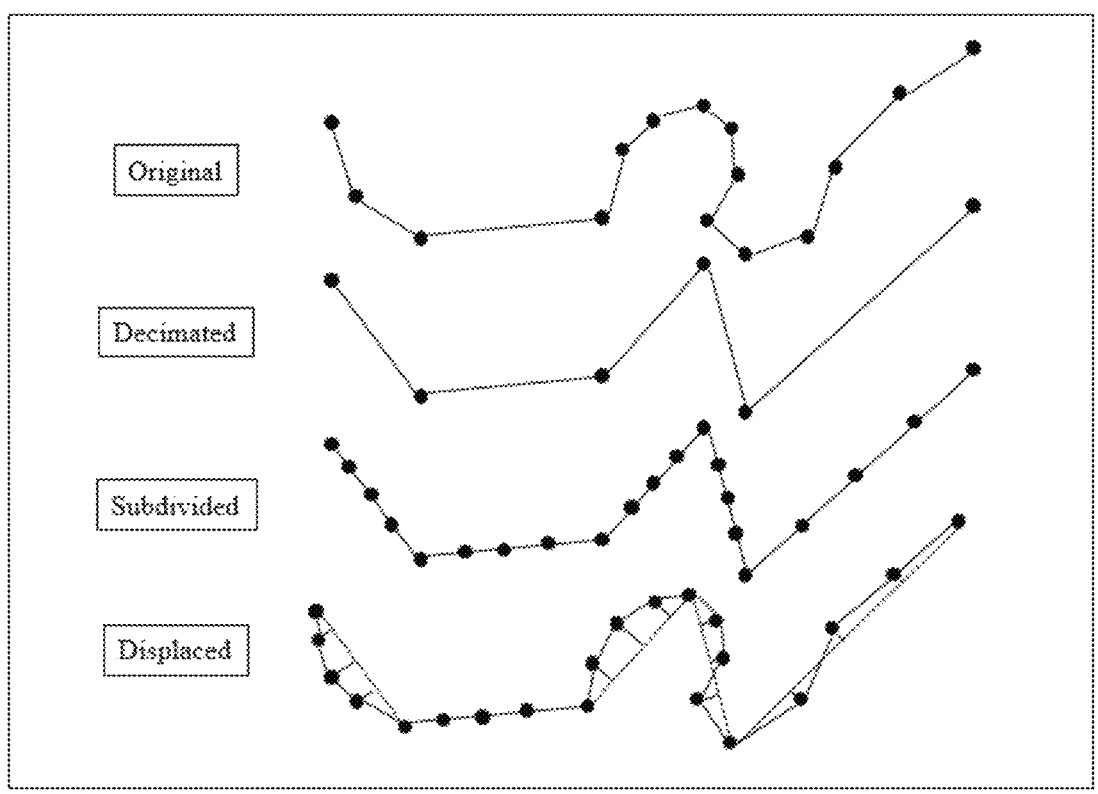
FIG. 3 is an illustration of a subdivision scheme, according to some embodiments.

The subdivision scheme may be utilized to efficiently compress dynamic meshes, and the 2D illustration is shown in FIG. 3, where the original curve is first decimated and subdivided. The subdivided polyline is then deformed to get a better approximation of the original curve. More precisely, a displacement vector is computed for each vertex of the subdivided mesh such that the shape of the displaced curve is as close as possible to the shape of the original curve. The main advantage of the subdivided curve is that it has a subdivision structure that allows efficient compression, while it offers a faithful approximation of the original curve.

Figure 4:
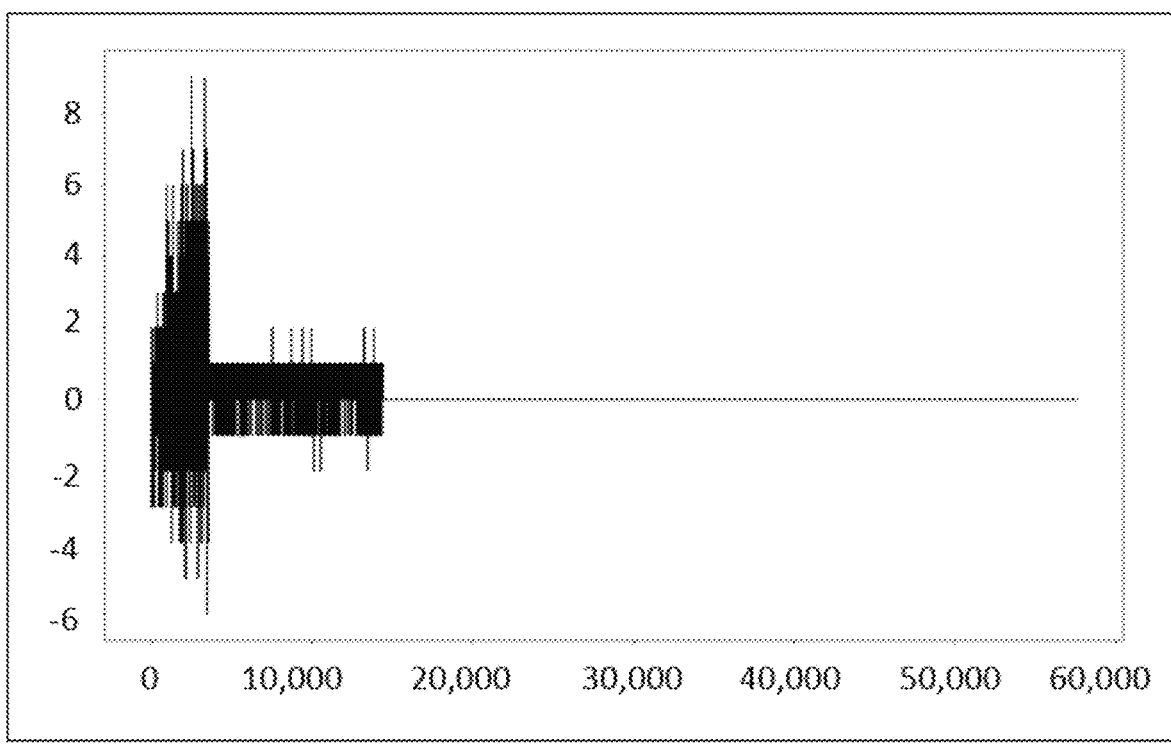
FIG. 4 is an example of ordered displacement coefficients, according to some embodiments.

In some embodiments, it is assumed that the vertex displacements (the displacement vectors) of subdivided meshes have been calculated and transformed, such that the outputs of the transform (namely the coefficients) have lower entropy compared to original displacements and thus can be more efficiently compressed. For instance, the magnitude of the scaling coefficients of wavelet transforms (low-frequency components) is generally larger than the wavelet coefficients (high-frequency components). As such, if the coefficients are quantized and ordered into a sequence from lower level of detail (LOD) to higher LOD, the magnitude of quantized coefficients will be statistically in descending order and most of the coefficients near the end of the sequence will be zeros. An example of the distribution of coefficients is shown in FIG. 4. Given those assumptions, the following methods to code the coefficients described above are proposed. In some embodiments, to apply the following methods, the above assumption may not need to be true.

In some embodiments, the current frame is coded using intra information only. Existing methods, such as arithmetic coding, may be used to encode the coefficients. In addition, if the coefficients have a tree structure, where high frequency coefficients are descendants of low frequency components, the tree structure may be exploited to improve the coding performance, such as the zerotree structure.

In some embodiments, the current frame is coded using inter picture information. In these embodiments, it is proposed to first predict the coefficients of current frame and then employ the methods used in intra coding frame to encode the prediction residues. The residues may be calculated as the difference between the original coefficients and the predicted coefficients. Specifically, in inter mode, the current mesh frame is tracked with the previous frame, meaning that there is one-to-one correspondence between the vertices of the current frame and the previous frame. Consequently, the coefficient of each vertex of the current frame may be predicted by using the coefficient of the corresponding vertex in the reference frame, for example, the previous frame. After that, the entropy coding may be performed on the prediction residues. In some embodiments, the prediction residues are encoded; in other embodiments, the original coefficients will be encoded. A signaling flag for each frame may be used to indicate such a selection. Since the distribution of prediction residues is different from the original coefficients, to further improve the coding efficiency, separate coding contexts may be used for coding prediction residues and original coefficients.

In some embodiments, depending on the distribution of the coefficients/residues, different coding methods may be employed for coefficients or coefficient residues in inter coded frames. In some embodiments, a syntax structure is proposed such that coefficients that have absolute values greater than 1 are identified and their location in the sequence as well as their values are signaled. Syntax elements to indicate such a purpose may include the number of these large coefficients, the distance from last large coefficients for the next large coefficients, etc. After that, the remaining coefficients are always either 0 or +1 or −1. To encode such a sequence, some embodiments simply indicate for each position using a flag to tell whether it is 0; if not, another sign flag is signaled to indicate whether it is positive 1 or negative 1.

Figure 5:
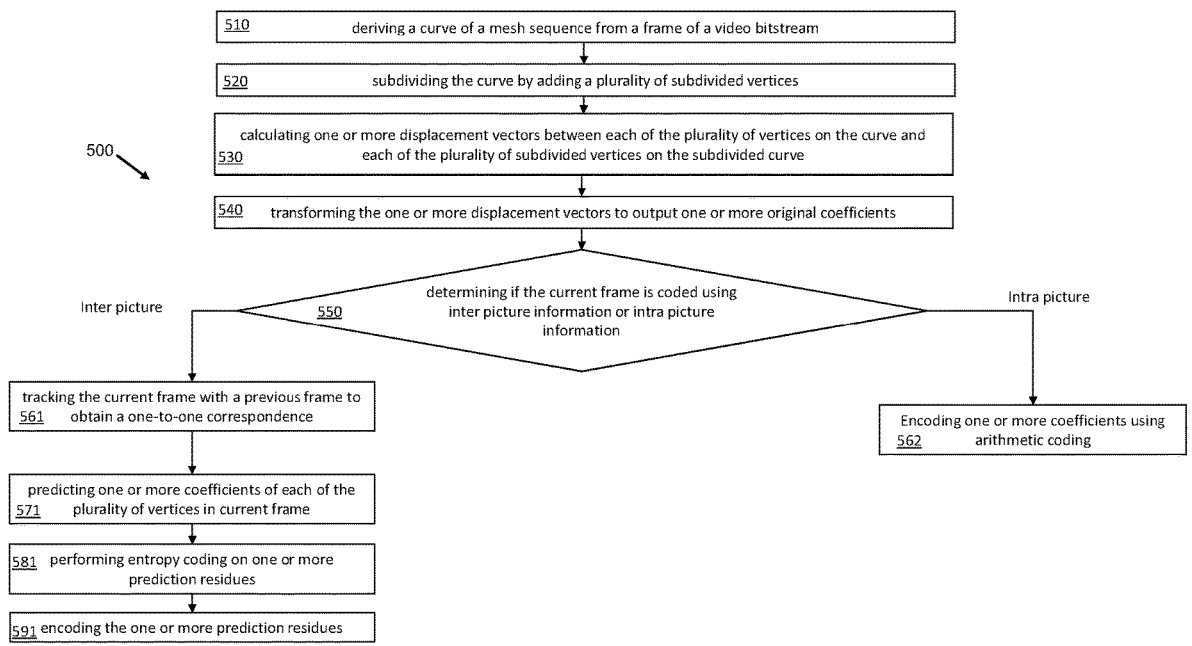
FIG. 5 is an operational flowchart illustrating the steps carried out by a program for encoding vertex displacements of a dynamic subdivided mesh, according to some embodiments.

FIG. 5 is a flowchart of example process 500 for encoding vertex displacements of a dynamic subdivided mesh. In some implementations, one or more process blocks of FIG. 5 may be performed by any of the elements discussed above.

As shown in FIG. 5, process 500 may include deriving a curve of a mesh sequence from a frame of a video bitstream, the curve comprising a plurality of vertices (block 510).

As further shown in FIG. 5, the process 500 may include subdividing the curve by adding a plurality of subdivided vertices (block 520).

As further shown in FIG. 5, the process 500 may include calculating one or more displacement vectors between each of the plurality of vertices on the curve and each of the plurality of subdivided vertices on the subdivided curve (block 530).

As shown in FIG. 5, process 500 may include transforming the one or more displacement vectors to output one or more original coefficients (block 540).

As further shown in FIG. 5, the process 500 may include determining if the current frame is coded using inter picture information or intra picture information (block 550).

As further shown in FIG. 5, in response to determining the current frame is coded using inter picture information the process 500 may include tracking the current frame with a previous frame to obtain a one-to-one correspondence between the plurality of vertices of the current frame and a plurality of vertices of the previous frame (block 561).

As further shown in FIG. 5, the process 500 may include predicting one or more coefficients of each of the plurality of vertices in current frame based on the one-to-one correspondence (block 571).

As further shown in FIG. 5, the process 500 may include performing entropy coding on one or more prediction residues (block 581).

As further shown in FIG. 5, the process 500 may include encoding the one or more prediction residues based on the one or more predicted coefficients (block 591).

As further shown in FIG. 5, in response to determining the current frame is coded using intra picture information the process 500 may include encoding one or more coefficients using arithmetic coding (block 562).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The techniques, described above, may be implemented as computer software using computer-readable instructions and physically stored in one or more computer-readable media. For example, FIG. 6 shows a computer system 900 suitable for implementing certain embodiments of the disclosure.

The computer software may be coded using any suitable machine code or computer language, that may be subject to assembly, compilation, linking, or like mechanisms to create code including instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

Figure 6:
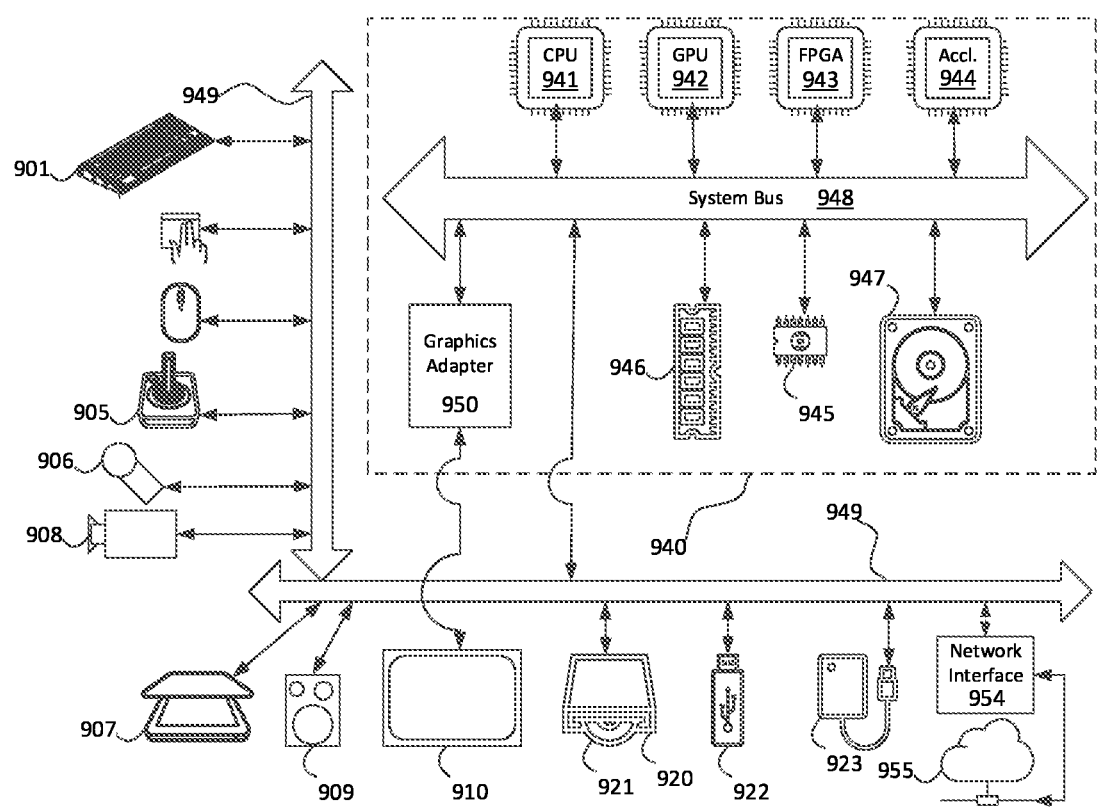
FIG. 6 is a diagram of a computer system suitable for implementing embodiments.

The components shown in FIG. 6 for computer system 900 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices may also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove, joystick 905, microphone 906, scanner 907, camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data glove, or joystick 905, but there may also be tactile feedback devices that do not serve as input devices). For example, such devices may be audio output devices (such as: speakers 909, headphones (not depicted)), visual output devices (such as screens 910 to include CRT screens, LCD screens, plasma screens, OLED screens, each with or without touch-screen input capability, each with or without tactile feedback capability some of which may be capable to output two dimensional visual output or more than three dimensional output through means such as stereographic output; virtual-reality glasses (not depicted), holographic displays and smoke tanks (not depicted)), and printers (not depicted).

Computer system 900 may also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 may also include interface to one or more communication networks. Networks may for example be wireless, wireline, optical. Networks may further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 949 (such as, for example USB ports of the computer system 900; others are commonly integrated into the core of the computer system 900 by attachment to a system bus as described below (for example Ethernet interface into a PC computer system or cellular network interface into a smartphone computer system). Using any of these networks, computer system 900 may communicate with other entities. Such communication may be uni-directional, receive only (for example, broadcast TV), uni-directional send-only (for example CANbus to certain CANbus devices), or bi-directional, for example to other computer systems using local or wide area digital networks. Such communication may include communication to a cloud computing environment 955. Certain protocols and protocol stacks may be used on each of those networks and network interfaces as described above.

Aforementioned human interface devices, human-accessible storage devices, and network interfaces 954 may be attached to a core 940 of the computer system 900.

The core 940 may include one or more Central Processing Units (CPU) 941, Graphics Processing Units (GPU) 942, specialized programmable processing units in the form of Field Programmable Gate Areas (FPGA) 943, hardware accelerators for certain tasks 944, and so forth. These devices, along with Read-only memory (ROM) 945, Random-access memory 946, internal mass storage such as internal non-user accessible hard drives, SSDs, and the like 947, may be connected through a system bus 948. In some computer systems, the system bus 948 may be accessible in the form of one or more physical plugs to enable extensions by additional CPUs, GPU, and the like. The peripheral devices may be attached either directly to the core's system bus 948, or through a peripheral bus 949. Architectures for a peripheral bus include PCI, USB, and the like. A graphics adapter 950 may be included in the core 940.

CPUs 941, GPUs 942, FPGAs 943, and accelerators 944 may execute certain instructions that, in combination, may make up the aforementioned computer code. That computer code may be stored in ROM 945 or RAM 946. Transitional data may be also be stored in RAM 946, whereas permanent data may be stored for example, in the internal mass storage 947. Fast storage and retrieve to any of the memory devices may be enabled through the use of cache memory, that may be closely associated with one or more CPU 941, GPU 942, mass storage 947, ROM 945, RAM 946, and the like.

The computer readable media may have computer code thereon for performing various computer-implemented operations. The media and computer code may be those specially designed and constructed for the purposes of the present disclosure, or they may be of the kind well known and available to those having skill in the computer software arts.

As an example and not by way of limitation, the computer system having architecture 900, and specifically the core 940 may provide functionality as a result of processor(s) (including CPUs, GPUs, FPGA, accelerators, and the like) executing software embodied in one or more tangible, computer-readable media. Such computer-readable media may be media associated with user-accessible mass storage as introduced above, as well as certain storage of the core 940 that are of non-transitory nature, such as core-internal mass storage 947 or ROM 945. The software implementing various embodiments of the present disclosure may be stored in such devices and executed by core 940. A computer-readable medium may include one or more memory devices or chips, according to particular needs. The software may cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system may provide functionality as a result of logic hardwired or otherwise embodied in a circuit (for example: accelerator 944), which may operate in place of or together with software to execute particular processes or particular parts of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method performed by at least one processor, the method comprising:
    deriving a curve of a mesh sequence from a frame of a video bitstream, the curve comprising a plurality of vertices;
    subdividing the curve by adding a plurality of subdivided vertices;
    calculating one or more displacement vectors between each of the plurality of vertices on the curve and each of the plurality of subdivided vertices on the subdivided curve;
    transforming the one or more displacement vectors to output one or more original coefficients;
    determining if the current frame is coded using inter picture information or intra picture information;
    in response to determining that the current frame is coded using inter picture information:
        tracking the current frame with a previous frame to obtain a one-to-one correspondence between the plurality of vertices of the current frame and a plurality of vertices of the previous frame;
        predicting one or more coefficients of each of the plurality of vertices in current frame based on the one-to-one correspondence;
        performing entropy coding on one or more prediction residues; and
        encoding the one or more prediction residues based on the one or more predicted coefficients;
    in response to determining that the current frame is coded using intra picture information:
        encoding one or more coefficients using arithmetic coding,
    wherein separate coding contexts are used for coding prediction residues and original coefficients.

2. The method according to claim 1, wherein the one or more original coefficients are encoded.

3. The method according to claim 2, wherein a signaling flag is used for each frame to indicate one or more original coefficients are to be encoded.

4. The method according to claim 3, wherein the prediction residues or the original coefficients are encoded using a syntax structure such that a corresponding location in a sequence and a corresponding value are signaled for each prediction residue or each original coefficient.

5. The method according to claim 4, further comprising indicating each corresponding location using a flag.

6. The method according to claim 1, wherein subdividing the curve comprises forming a decimated curve by decimating the curve and adding the plurality of subdivided vertices to the decimated curve.

7. An apparatus comprising:
    at least one memory configured to store program code; and
    at least one processor configured to read the program code and operate as instructed by the program code, the program code comprising:
        deriving code configured to cause the at least one processor to derive a curve of a mesh sequence from a frame of a video bitstream, the curve comprising a plurality of vertices;
        subdividing code configured to cause the at least one processor to subdivide the curve by adding a plurality of subdivided vertices;
        calculating code configured to cause the at least one processor to calculate one or more displacement vectors between each of the plurality of vertices on the curve and each of the plurality of subdivided vertices on the subdivided curve;
        transforming code configured to cause the at least one processor to transform the one or more displacement vectors to output one or more original coefficients;
        determining code configured to cause the at least one processor to determine if the current frame is coded using inter picture information or intra picture information;
        first response code configured to cause the at least one processor to, in response to a determination that the current frame is coded using inter picture information:
            track the current frame with a previous frame to obtain a one-to-one correspondence between the plurality of vertices of the current frame and a plurality of vertices of the previous frame;
            predict one or more coefficients of each of the plurality of vertices in current frame based on the one-to-one correspondence;
            perform entropy coding on one or more prediction residues; and
            encode the one or more prediction residues based on the one or more predicted coefficients;
        second response code configured to cause the at least one processor to, in response to a determination that the current frame is coded using intra picture information:
            encode one or more coefficients using arithmetic coding,
    wherein separate coding contexts are used for coding prediction residues and original coefficients.

8. The apparatus according to claim 7, wherein the one or more original coefficients are encoded.

9. The apparatus according to claim 8, wherein a signaling flag is used for each frame to indicate one or more original coefficients are to be encoded.

10. The apparatus according to claim 9, wherein the prediction residues or the original coefficients are encoded using a syntax structure such that a corresponding location in a sequence and a corresponding value are signaled for each prediction residue or each original coefficient.

11. The apparatus according to claim 10, wherein the program code further includes indicating code configured to cause the at least one processor to indicate each corresponding location using a flag.

12. The apparatus according to claim 7, wherein subdividing the curve comprises forming a decimated curve by decimating the curve and adding the plurality of subdivided vertices to the decimated curve.

13. A non-transitory computer-readable storage medium, storing instructions, which, when executed by at least one processor, cause the at least one processor to:

derive a curve of a mesh sequence from a frame of a video bitstream, the curve comprising a plurality of vertices;

subdivide the curve by adding a plurality of subdivided vertices;

calculate one or more displacement vectors between each of the plurality of vertices on the curve and each of the plurality of subdivided vertices on the subdivided curve;

transform the one or more displacement vectors to output one or more original coefficients;

determine if the current frame is coded using inter picture information or intra picture information;

in response to determining that the current frame is coded using inter picture information the instructions cause the at least one processor to:

track the current frame with a previous frame to obtain a one-to-one correspondence between the plurality of vertices of the current frame and a plurality of vertices of the previous frame;

predict one or more coefficients of each of the plurality of vertices in current frame based on the one-to-one correspondence;

perform entropy coding on one or more prediction residues; and encode the one or more prediction residues based on the one or more predicted coefficients;

in response to determining that the current frame is coded using intra picture information the instructions cause the at least one processor to:

encode one or more coefficients using arithmetic coding, wherein separate coding contexts are used for coding prediction residues and original coefficients.

14. The non-transitory computer-readable storage medium according to claim 13, wherein the one or more original coefficients are encoded.

15. The non-transitory computer-readable storage medium according to claim 14, wherein a signaling flag is used for each frame to indicate one or more original coefficients are to be encoded.

16. The non-transitory computer-readable storage medium according to claim 15, wherein the prediction residues or the original coefficients are encoded using a syntax structure such that a corresponding location in a sequence and a corresponding value are signaled for each prediction residue or each original coefficient.

17. The non-transitory computer-readable storage medium according to claim 16, wherein the instructions further cause the at least one processor to indicate each corresponding location using a flag.

* * * * *